United States Patent
Dubois et al.

(10) Patent No.: US 7,881,690 B2
(45) Date of Patent: Feb. 1, 2011

(54) SYSTEM AND METHOD FOR ZERO INTERMEDIATE FREQUENCY FILTERING OF INFORMATION COMMUNICATED IN WIRELESS NETWORKS

(75) Inventors: Marc Dubois, Ottawa (CA); Stephen Rayment, Kanata (CA); Andrew Keir, Nepean (CA); Kieran Parsons, Ottawa (CA)

(73) Assignee: Belair Networks Inc. (CA)

( * ) Notice: Subject to any disclaimer, the term of this patent is extended or adjusted under 35 U.S.C. 154(b) by 1157 days.

(21) Appl. No.: 11/399,536

(22) Filed: Apr. 7, 2006

(65) Prior Publication Data
US 2007/0238419 A1    Oct. 11, 2007

(51) Int. Cl.
*H04B 1/10* (2006.01)

(52) U.S. Cl. .................. 455/307; 455/501; 455/63.1; 455/67.13; 455/114.2; 455/278.1; 455/296; 343/770

(58) Field of Classification Search .......... 455/130, 455/562.1, 196.1, 232, 1, 234.1, 501–506, 455/63.1, 67.13, 114.1–114.3, 278.1, 283–287, 455/296, 307; 343/770; 370/316; 331/25, 331/45
See application file for complete search history.

(56) References Cited

U.S. PATENT DOCUMENTS

| | | | |
|---|---|---|---|
| 4,755,761 A | 7/1988 | Ray, Jr. | |
| 5,170,500 A | 12/1992 | Broderick | |
| 5,212,827 A | 5/1993 | Meszko et al. | |
| 5,483,691 A * | 1/1996 | Heck et al. | 455/234.2 |
| 5,710,998 A | 1/1998 | Opas | |
| 5,715,281 A | 2/1998 | Bly et al. | |
| 5,761,615 A | 6/1998 | Jaffee | |
| 5,835,487 A * | 11/1998 | Campanella | 370/316 |
| 6,161,004 A | 12/2000 | Galal et al. | |
| 6,363,123 B1 * | 3/2002 | Balodis | 375/316 |
| 6,442,380 B1 | 8/2002 | Mohindra | |
| 6,560,448 B1 | 5/2003 | Baldwin | |
| 6,728,517 B2 | 4/2004 | Sugar et al. | |

(Continued)

FOREIGN PATENT DOCUMENTS

WO    WO 02 54606    7/2002

OTHER PUBLICATIONS

International Search Report for International Application No. PCT/CA 2007/000581; mailed on: Jul. 25, 2007.

*Primary Examiner*—Edward Urban
*Assistant Examiner*—Junpeng Chen
(74) *Attorney, Agent, or Firm*—Katten Muchin Rosenman LLP (57) ABSTRACT

A circuit for communicating information in a wireless network includes a filtering circuit in communication with a zero intermediate frequency (ZIF) transceiver circuit. The filtering circuit includes a first mixer in communication with an output of the ZIF transceiver circuit. The filtering circuit includes a first Surface Acoustic Wave (SAW) filter circuit in communication with an output of the first mixer. The filtering circuit includes a second mixer in communication with an output of the first SAW filter circuit. The filtering circuit includes a third mixer, and a second SAW filter circuit in communication with an output of the third mixer. The filtering circuit includes a fourth mixer in communication with an output of the second SAW filter circuit and an input of the ZIF transceiver circuit. The filtering circuit also includes a local oscillator circuit in communication with the first, second, third and fourth mixers.

27 Claims, 3 Drawing Sheets

U.S. PATENT DOCUMENTS

| | | |
|---|---|---|
| 6,735,422 B1 | 5/2004 | Baldwin et al. |
| 6,778,594 B1 | 8/2004 | Liu |
| 6,960,962 B2 | 11/2005 | Peterzell et al. |
| 7,009,573 B2 * | 3/2006 | Hornsby et al. ............. 343/770 |
| 7,194,044 B2 | 3/2007 | Birkett et al. |
| 2002/0003586 A1 | 1/2002 | Busson et al. |
| 2002/0039052 A1 * | 4/2002 | Straub et al. .................. 331/45 |
| 2002/0042255 A1 * | 4/2002 | Prentice ................... 455/232.1 |
| 2002/0042256 A1 * | 4/2002 | Baldwin et al. .......... 455/232.1 |
| 2002/0086651 A1 * | 7/2002 | Prentice et al. .......... 455/234.1 |
| 2002/0103012 A1 * | 8/2002 | Kim et al. .................... 455/562 |
| 2002/0163391 A1 * | 11/2002 | Peterzell ....................... 331/25 |
| 2004/0038649 A1 * | 2/2004 | Lin et al. ..................... 455/130 |
| 2004/0127187 A1 | 7/2004 | Peterson et al. |
| 2004/0180640 A1 * | 9/2004 | Zipper ..................... 455/196.1 |
| 2004/0214548 A1 | 10/2004 | Jovenin et al. |
| 2006/0292996 A1 | 12/2006 | Malasani et al. |

* cited by examiner

SYSTEM AND METHOD FOR ZERO INTERMEDIATE FREQUENCY FILTERING OF INFORMATION COMMUNICATED IN WIRELESS NETWORKS

BACKGROUND

1. Field of the Invention

The present invention relates to information communication systems. More particularly, the present invention relates to a system and method for zero intermediate frequency (ZIF) filtering of information communicated in wireless networks.

2. Background Information

Conventionally, off-the-shelf semiconductor chip sets can be used to communicate information in networks, such as, for example, wireless mesh networks or the like. Such chip sets can include several chips (e.g., three or four or any suitable number), with each chip comprising a stage in the communication process. In such communication systems, as the transmission power is boosted, concomitant noise, distortion and spurious signals also increase. Accordingly, additional filtering can be appropriately added between each or any of the chips in the chip set to provide suitable filtering between each stage of the communication process.

As technology has progressed, however, the multiple chips in these chips sets have been integrated into a single chip or device. Consequently, filtering noise between individual stages of the communication processing becomes problematic once the various stages are integrated into the single chip or device. In particular, for example, for wireless communication systems, the noise, distortion and spurious signals produced by a zero intermediate frequency (ZIF) chip or the like can limit the amount of amplification of the signal by the power amplifier chain at the given (wireless) signal frequency (e.g., 2.4 GHz for I.E.E.E. 802.11 applications or the like). For ZIF transmission systems, simply using filters at the given signal transmission frequency cannot adequately filter such noise, distortion and spurious signals to allow higher power transmissions meeting regulatory certification requirements. Additionally, ZIF receive systems have limited capacity to reject noise in a high-noise environment or to reject high-level interferers, and filtering at the given signal reception frequency does not substantially improve the performance of such systems.

Therefore, there is a need to suppress and filter noise, distortion and other spurious signals in such communication systems, particularly in such systems that use a single chip or device for communication processing.

SUMMARY OF THE INVENTION

A system and method are disclosed for zero intermediate frequency (ZIF) filtering of information communicated in wireless networks. In accordance with exemplary embodiments of the present invention, according to a first aspect of the present invention, an apparatus for communicating information includes a filtering module in communication with a ZIF communication circuit. The filtering module includes a first mixer circuit in communication with an output of the ZIF communication circuit. The first mixer circuit is configured to down-convert a transmission signal at a first frequency from the ZIF communication circuit to a second frequency to generate a down-converted transmission signal. The filtering module includes a first filtering circuit in communication with an output of the first mixer circuit. The first filtering circuit is configured to filter the down-converted transmission signal to generate a filtered down-converted transmission signal. The filtering module includes a second mixer circuit in communication with an output of the first filtering circuit. The second mixer circuit is configured to up-convert the filtered down-converted transmission signal to a third frequency to generate a filtered transmission signal. The filtering module includes a third mixer circuit. The third mixer circuit is configured to receive a received signal at a fourth frequency. The third mixer circuit is configured to down-convert the received signal to a fifth frequency to generate a down-converted received signal. The filtering module includes a second filtering circuit in communication with an output of the third mixer circuit. The second filtering circuit is configured to filter the down-converted received signal to generate a filtered down-converted received signal. The filtering module includes a fourth mixer circuit in communication with the second filtering circuit. The fourth mixer circuit is configured to up-convert the filtered down-converted received signal to a sixth frequency to generate a filtered received signal. The ZIF communication circuit is in communication with an output of the fourth mixer circuit. The filtering module includes at least one oscillator circuit in communication with the first, second, third and fourth mixer circuits. The at least one oscillator circuit is configured to control mixing frequencies of the first, second, third and fourth mixer circuits.

According to the first aspect, at least one of the first and second filtering circuits can comprise a Surface Acoustic Wave (SAW) filter circuit. The at least one oscillator can comprise a Phase Locked Loop (PLL) oscillator circuit. The at least one oscillator circuit can comprise a first oscillator circuit and a second oscillator circuit. The first oscillator circuit can be in communication with the first and fourth mixer circuits. The second oscillator circuit can be in communication with the second and third mixer circuits. At least one of the first and second oscillator circuits can comprise a PLL oscillator circuit. The first, third, fourth, and sixth frequencies can be substantially identical. The second and fifth frequencies can be substantially identical. An output of the second mixer circuit can be in communication with a transmitter circuit. The transmitter circuit can be configured to transmit the filtered transmission signal. An input of the third mixer circuit can be in communication with a receiver circuit. The receiver circuit can be configured to receive the received signal. The apparatus can be configured to filter information communicated in a wireless mesh network or other suitable type of wireless or wired network. The apparatus can be formed on a monolithic substrate. According to an exemplary embodiment of the first aspect, the apparatus can be compatible with a standard including at least one of I.E.E.E. 802.11, 802.11a, 802.11b, 802.11g, 802.11n, 802.11s, 802.16 and 802.20 or any other suitable wireless or wired standard.

According to a second aspect of the present invention, a system for communicating information includes a ZIF transceiver circuit, and a filtering circuit in communication with the ZIF transceiver circuit. The filtering circuit includes a first mixer. The first mixer is configured to down-convert a transmission signal at a first frequency communicated from the ZIF transceiver circuit to a second frequency to generate a down-converted transmission signal. The filtering circuit includes a first SAW filter in communication with an output of the first mixer circuit. The first SAW filter is configured to filter the down-converted transmission signal to generate a filtered down-converted transmission signal. The filtering circuit includes a second mixer in communication with an output of the first SAW filter. The second mixer is configured to up-convert the filtered down-converted transmission signal to the first frequency to generate a filtered transmission signal. The filtering circuit includes a third mixer. The third mixer is configured to down-convert a received signal at the first frequency to the second frequency to generate a down-converted received signal. The filtering circuit includes a second SAW filter in communication with an output of the third mixer. The second SAW filter is configured to filter the down-converted received signal to generate a filtered down-converted received signal. The filtering circuit includes a fourth mixer in communication with the second SAW filter. The fourth mixer is configured to up-convert the filtered down-converted received signal to the first frequency to generate a filtered received signal for communication to the ZIF transceiver circuit. The filtering circuit includes a phase locked loop (PLL) oscillator circuit in communication with the first, second, third and fourth mixer circuits.

According to the second aspect, the PLL oscillator circuit can comprise a first PLL oscillator circuit and a second PLL oscillator circuit. The first PLL oscillator circuit can be in communication with the first and fourth mixers. The second PLL oscillator circuit can be in communication with the second and third mixers. An output of the second mixer circuit can be in communication with a transmitter circuit. The transmitter circuit can be configured to transmit the filtered transmission signal. An input of the third mixer circuit can be in communication with a receiver circuit. The receiver circuit can be configured to receive the received signal. The filtering circuit can be configured to filter information communicated in a wireless mesh network or other suitable type of wireless or wired network. The filtering circuit can be formed on a monolithic substrate. According to an exemplary embodiment of the second aspect, the system is compatible with a standard including at least one of I.E.E.E. 802.11, 802.11a, 802.11b, 802.11g, 802.11n, 802.11s, 802.16 and 802.20 or any other suitable wireless or wired standard.

According to a third aspect of the present invention, a circuit for communicating information in a wireless network includes a filtering circuit in communication with a transmitter/receiver circuit. The filtering circuit includes a first frequency down-converter circuit in communication with an output of the transmitter/receiver circuit. The filtering circuit includes a first filter circuit in communication with an output of the first frequency down-converter circuit. The filtering circuit includes a first frequency up-converter circuit in communication with an output of the first filter circuit. The filtering circuit includes a second frequency down-converter circuit. The filtering circuit includes a second filter circuit in communication with an output of the second frequency down-converter circuit. The filtering circuit includes a second frequency up-converter circuit in communication with an output of the second filter circuit and an input of the transmitter/receiver circuit. The filtering circuit includes a local oscillator circuit in communication with the first and second frequency down-converter circuits and the first and second frequency up-converter circuits.

According to the third aspect, at least one of the first and second filter circuits can comprise a SAW filter circuit. The local oscillator circuit can comprise a PLL oscillator circuit. The local oscillator circuit can comprise a first local oscillator circuit and a second local oscillator circuit. The first local oscillator circuit can be in communication with the first frequency down-converter circuit and the second frequency up-converter circuit. The second local oscillator circuit can be in communication with the first frequency up-converter circuit and the second frequency down-converter circuit. At least one of the first and second local oscillator circuits can comprise a PLL oscillator circuit. An output of the first frequency up-converter circuit can be in communication with a transmitter circuit. The transmitter circuit can be configured to transmit a filtered transmission signal. An input of the second frequency down-converter circuit can be in communication with a receiver circuit. The receiver circuit can be configured to receive the received signal. The circuit can be configured to filter information communicated in a wireless mesh network or other suitable type of wireless or wired network. The circuit can be formed on a monolithic substrate. According to an exemplary embodiment of the third aspect, the circuit can be compatible with a standard including at least one of I.E.E.E. 802.11, 802.11a, 802.11b, 802.11g, 802.11n, 802.11s, 802.16 and 802.20 or any other suitable wireless or wired standard.

According to a fourth aspect of the present invention, a method of communicating information to/from a ZIF communication circuit includes the steps of: a.) down-converting a transmission signal at a first frequency from the ZIF communication circuit to a second frequency to generate a down-converted transmission signal; b.) filtering the down-converted transmission signal to generate a filtered down-converted transmission signal; c.) up-converting the filtered down-converted transmission signal to a third frequency to generate a filtered transmission signal; d.) down-converting a received signal at a fourth frequency to a fifth frequency to generate a down-converted received signal; e.) filtering the down-converted received signal to generate a filtered down-converted received signal; and f.) up-converting the filtered down-converted received signal to a sixth frequency to generate a filtered received signal for the ZIF communication circuit.

According to the fourth aspect, the method can include the step of: g.) controlling mixing frequencies of steps (a), (c), (d) and (f). Step (g) can include the steps of: g1.) controlling the mixing frequencies of steps (a) and (f); and g2.) separately controlling the mixing frequencies of steps (c) and (d). Step (b) can include the step of: b1.) SAW filtering the down-converted transmission signal. Step (e) can include the step of: e1.) SAW filtering the down-converted received signal. The first, third, fourth, and sixth frequencies can be substantially identical. The second and fifth frequencies can be substantially identical. The method can include the steps of: h.) transmitting the filtered transmission signal; and i.) receiving the received signal. The transmission signal and the received signal can be communicated in a wireless mesh network or other suitable type of wireless or wired network. According to an exemplary embodiment of the fourth aspect, the method can be compatible with a standard including at least one of I.E.E.E. 802.11, 802.11a, 802.11b, 802.11g, 802.11n, 802.11s, 802.16 and 802.20 or any other suitable wireless or wired standard.

According to a fifth aspect of the present invention, a method of communicating information includes the steps of: a.) down-converting a transmission signal at a first frequency to a second frequency to generate a down-converted transmission signal; b.) filtering the down-converted transmission signal to generate a filtered down-converted transmission signal; c.) up-converting the filtered down-converted transmission signal to a third frequency to generate a filtered transmission signal; and d.) transmitting the filtered transmission signal.

According to the fifth aspect, the method can include the step of: e.) controlling mixing frequencies of steps (a) and (c). Step (b) can include the step of: b1.) SAW filtering the down-converted transmission signal. The first and third frequencies can be substantially identical. The transmission signal can be communicated in a wireless mesh network or other suitable type of wireless or wired network. According to an exemplary embodiment of the fifth aspect, the method can be compatible with a standard including at least one of I.E.E.E. 802.11, 802.11a, 802.11b, 802.11g, 802.11n, 802.11s, 802.16 and 802.20 or any other suitable wireless or wired standard.

According to a sixth aspect of the present invention, a method of communicating information includes the steps of: a.) receiving a received signal at a first frequency; b.) down-converting the received signal at the first frequency to a second frequency to generate a down-converted received signal; c.) filtering the down-converted received signal to generate a filtered down-converted received signal; and d.) up-converting the filtered down-converted received signal to a third frequency to generate a filtered received signal.

According to the sixth aspect, the method can include the step of: e.) controlling mixing frequencies of steps (b) and (d). Step (c) can include the step of: c1.) SAW filtering the down-converted received signal. The first and third frequencies can be substantially identical. The received signal can be communicated in a wireless mesh network or other suitable type of wireless or wired network. According to an exemplary embodiment of the sixth aspect, the method can be compatible with a standard including at least one of I.E.E.E. 802.11, 802.11a, 802.11b, 802.11g, 802.11n, 802.11s, 802.16 and 802.20 or any other suitable wireless or wired standard.

According to a seventh aspect of the present invention, an apparatus for communicating information includes a filtering module in communication with a ZIF communication circuit. The filtering module includes a first means for mixing frequency in communication with an output of the ZIF communication circuit. The first frequency mixing means is configured to down-convert a transmission signal at a first frequency from the ZIF communication circuit to a second frequency to generate a down-converted transmission signal. The filtering module includes a first means for filtering in communication with an output of the first frequency mixing means. The first filtering means is configured to filter the down-converted transmission signal to generate a filtered down-converted transmission signal. The filtering module includes a second means for mixing frequency in communication with an output of the first filtering means. The second frequency mixing means is configured to up-convert the filtered down-converted transmission signal to a third frequency to generate a filtered transmission signal. The filtering module includes a third means for mixing frequency. The third frequency mixing means is configured to receive a received signal at a fourth frequency. The third frequency mixing means is configured to down-convert the received signal to a fifth frequency to generate a down-converted received signal. The filtering module includes a second means for filtering in communication with an output of the third frequency mixing means. The second filtering means is configured to filter the down-converted received signal to generate a filtered down-converted received signal. The filtering module includes a fourth means for mixing frequency in communication with the second filtering means. The fourth frequency mixing means is configured to up-convert the filtered down-converted received signal to a sixth frequency to generate a filtered received signal. The ZIF communication circuit is in communication with an output of the fourth frequency mixing means. The filtering module includes at least one means for oscillating in communication with the first, second, third and fourth frequency mixing means. The at least one oscillating means is configured to control mixing frequencies of the first, second, third and fourth frequency mixing means.

According to the seventh aspect, at least one of the first and second filtering means can comprise a means for SAW filtering. The at least one oscillating means can comprise a means for PLL oscillating. The at least one oscillating means can comprise a first means for oscillating and a second means for oscillating. The first oscillating means can be in communication with the first and fourth frequency mixing means. The second oscillating means can be in communication with the second and third frequency mixing means. At least one of the first and second oscillating means can comprise a means for PLL oscillating. The first, third, fourth, and sixth frequencies can be substantially identical. The second and fifth frequencies can be substantially identical. An output of the second frequency mixing means can be in communication with a means for transmitting. The transmitting means can be configured to transmit the filtered transmission signal. An input of the third frequency mixing means can be in communication with a means for receiving. The receiving means can be configured to receive the received signal. The apparatus can be configured to filter information communicated in a wireless mesh network or other suitable type of wireless or wired network. The apparatus can be formed on a monolithic substrate. According to an exemplary embodiment of the seventh aspect, the apparatus can be compatible with a standard including at least one of I.E.E.E. 802.11, 802.11a, 802.11b, 802.11g, 802.11n, 802.11s, 802.16 and 802.20 or any other suitable wireless or wired standard.

According to an eighth aspect of the present invention, a system for communicating information includes a ZIF transceiver circuit, and a filtering circuit in communication with the ZIF transceiver circuit. The filtering circuit includes a first means for mixing frequency. The first frequency mixing means is configured to down-convert a transmission signal at a first frequency communicated from the ZIF transceiver circuit to a second frequency to generate a down-converted transmission signal. The filtering circuit includes a first means for SAW filtering in communication with an output of the first frequency mixing means. The first SAW filtering means is configured to filter the down-converted transmission signal to generate a filtered down-converted transmission signal. The filtering circuit includes a second means for mixing frequency in communication with an output of the first SAW filtering means. The second frequency mixing means is configured to up-convert the filtered down-converted transmission signal to the first frequency to generate a filtered transmission signal. The filtering circuit includes a third means for mixing frequency. The third frequency mixing means is configured to down-convert a received signal at the first frequency to the second frequency to generate a down-converted received signal. The filtering circuit includes a second means for SAW filtering in communication with an output of the third frequency mixing means. The second SAW filtering means is configured to filter the down-converted received signal to generate a filtered down-converted received signal. The filtering circuit includes a fourth means for mixing frequency in communication with the second SAW filtering means. The fourth frequency mixing means is configured to up-convert the filtered down-converted received signal to the first frequency to generate a filtered received signal for communication to the ZIF transceiver circuit. The filtering circuit includes a means for PLL oscillating in communication with the first, second, third and fourth frequency mixing means.

According to the eighth aspect, the PLL oscillating means can comprise a first means for PLL oscillating and a second means for PLL oscillating. The first PLL oscillating means can be in communication with the first and fourth frequency mixing means. The second PLL oscillating means can be in communication with the second and third frequency mixing means. An output of the second frequency mixing means can be in communication with a means for transmitting. The transmitting means can be configured to transmit the filtered transmission signal. An input of the third frequency mixing means can be in communication with a means for receiving. The receiving means can be configured to receive the received signal. The filtering circuit can be configured to filter information communicated in a wireless mesh network or other suitable type of wireless or wired network. The filtering circuit can be formed on a monolithic substrate. According to an exemplary embodiment of the eighth aspect, the system can be compatible with a standard including at least one of I.E.E.E. 802.11, 802.11a, 802.11b, 802.11g, 802.11n, 802.11s, 802.16 and 802.20 or any other suitable wireless or wired standard.

According to a ninth aspect of the present invention, a circuit for communicating information in a wireless network includes a filtering circuit in communication with a transmitter/receiver circuit. The filtering circuit includes a first means for frequency down-converting in communication with an output of the transmitter/receiver circuit. The filtering circuit includes a first means for filtering in communication with an output of the first frequency down-converting means. The filtering circuit includes a first means for frequency up-converting in communication with an output of the first filtering means. The filtering circuit includes a second means frequency down-converting. The filtering circuit includes a second means for filtering in communication with an output of the second frequency down-converting means. The filtering circuit includes a second means for frequency up-converting circuit in communication with an output of the second filtering means and an input of the transmitter/receiver circuit. The filtering circuit includes a means for local oscillating in communication with the first and second frequency down-converting means and the first and second frequency up-converting means.

According to the ninth aspect, at least one of the first and second filtering means includes a means for SAW filtering. The local oscillating means can comprise a means for PLL oscillating. The means for local oscillating can comprise a first means for local oscillating and a second means for local oscillating. The first local oscillating means can be in communication with the first frequency down-converting means and the second frequency up-converting means. The second local oscillating means can be in communication with the first frequency up-converting means and the second frequency down-converting means. At least one of the first and second local oscillating means can comprise a means for PLL oscillating. An output of the first frequency up-converting means can be in communication with a means for transmitting. The transmitting means can be configured to transmit a filtered transmission signal. An input of the second frequency down-converting means can be in communication with a means for receiving. The receiving means can be configured to receive the received signal. The circuit can be configured to filter information communicated in a wireless mesh network or other suitable type of wireless or wired network. The circuit can be formed on a monolithic substrate. According to an exemplary embodiment of the ninth aspect, the circuit can be compatible with a standard including at least one of I.E.E.E. 802.11, 802.11a, 802.11b, 802.11g, 802.11n, 802.11s, 802.16 and 802.20 or any other suitable wireless or wired network.

According to a tenth aspect of the present invention, a circuit for communicating information in a wireless network includes a filtering module in communication with a transmitter/receiver circuit. The filtering module includes a frequency down-converter circuit in communication with an output of the transmitter/receiver circuit. The filtering module includes a filter circuit in communication with an output of the frequency down-converter circuit. The filtering module includes a frequency up-converter circuit in communication with an output of the filter circuit. The filtering module includes a local oscillator circuit in communication with the frequency down-converter circuit and the frequency up-converter circuit.

According to an eleventh aspect of the present invention, a circuit for communicating information in a wireless network includes a filtering module in communication with a transmitter/receiver circuit. The filtering module includes a frequency down-converter circuit. The filtering module includes a filter circuit in communication with an output of the frequency down-converter circuit. The filtering module includes a frequency up-converter circuit in communication with an output of the filter circuit and an input of the transmitter/receiver circuit. The filtering module includes a local oscillator circuit in communication with the frequency down-converter circuit and the frequency up-converter circuit.

According to a twelfth aspect of the present invention, a circuit for communicating information in a wireless network includes a filtering module in communication with a transmitter/receiver circuit. The filtering module includes a means for frequency down-converting in communication with an output of the transmitter/receiver circuit. The filtering module includes a means for filtering in communication with an output of the frequency down-converting means. The filtering module includes a means for frequency up-converting in communication with an output of the filtering means. The filtering module includes a means for local oscillating in communication with the frequency down-converting means and the frequency up-converting means.

According to a thirteenth aspect of the present invention, a circuit for communicating information in a wireless network includes a filtering module in communication with a transmitter/receiver circuit. The filtering module includes a means for frequency down-converting. The filtering module includes a means for filtering in communication with an output of the frequency down-converting means. The filtering module includes a means for frequency up-converting in communication with an output of the filtering means and an input of the transmitter/receiver circuit. The filtering module includes a means for local oscillating in communication with the frequency down-converting means and the frequency up-converting means.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for zero intermediate frequency (ZIF) filtering of information communicated in wireless or wired networks, such as, for example, wireless mesh networks and the like. According to exemplary embodiments, a filtering module can be coupled between a ZIF transmitter/receiver or other similar type of transceiver circuit and the transmit and receive chains of a suitable communication system. According to exemplary embodiments, the filtering module can be added to the communication system to suppress or otherwise filter noise and distortion without having to substantially change the operation of the chip set. The filtering module is configured to use a "double-conversion" scheme to suppress such noise and other like interference in "wireless fidelity" (WiFi) and other suitable types of wireless and wired communication signals and systems (e.g., WiMax and the like).

In particular, according to the double-conversion scheme of the present invention, a transmit signal at a frequency $F_1$ from the ZIF communication circuit can be down-converted to a lower intermediate frequency $F_{IF}$. The down-converted signal can be filtered to reject noise, distortion and spurious signals that are limiting the desired (transmission) system performance. The filtered transmit signal can then be up-converted to the original frequency $F_1$ for transmission, with the noise, distortion and spurious signals removed or substantially reduced. Conversely, a received signal at the frequency $F_1$ can be down-converted to the lower intermediate frequency $F_{IF}$. The down-converted signal can also be filtered to reject noise that is limiting the desired (receiver) system performance. The filtered received signal can then be up-converted back to the original frequency $F_1$, with the noise removed and the signal ready for processing by the ZIF communication circuit.

According to exemplary embodiments, the double-conversion process can be accomplished using a suitable set of mixers fed by a Phase Locked Loop (PLL) oscillator or any suitable type of radio frequency (RF) oscillator, with a frequency that is dependent upon the desired transmit/receive frequency(ies) (e.g., $F_1$) and intermediate frequency (e.g., $F_{IF}$) that incorporate the filter. The filtering can be performed by a suitable Surface Acoustic Wave (SAW) filter or other like filter at the intermediate frequency $F_{IF}$. In contrast, if filtering was conventionally performed on the transmit and receive signals at the frequency $F_1$, the SAW filter would need to be adaptive and tunable to track the original signal, thereby substantially increasing the complexity of the architecture. Consequently, exemplary embodiments can be used to suppress noise, distortion and spurious signals using a double-conversion scheme that can reduce the complexity of the filtering architecture for filtering transmit signals from and receive signals to a ZIF communication circuit or other like transceiver circuit or device.

Figure 1:
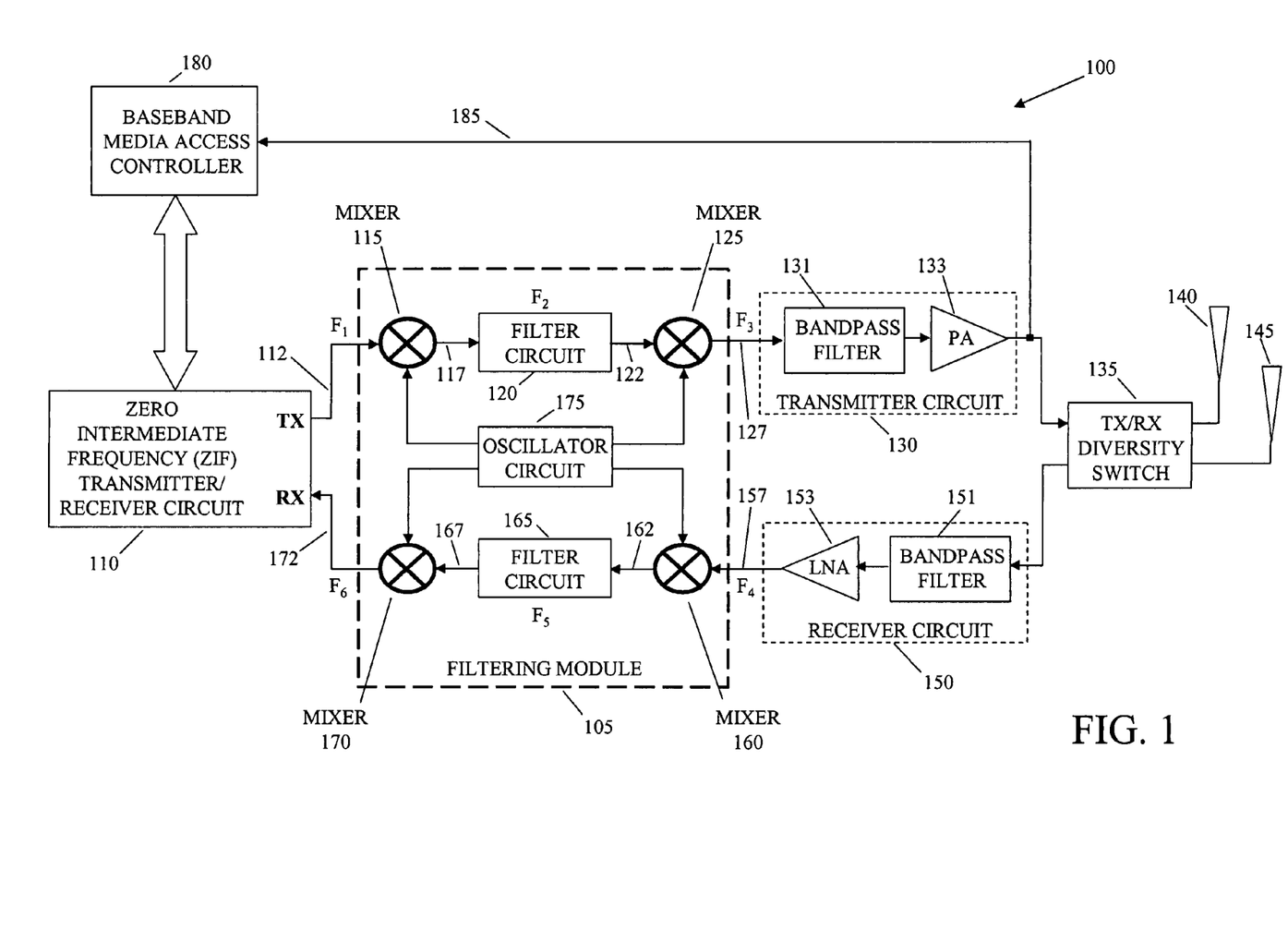
FIG. 1 is a diagram illustrating a system for communicating information, in accordance with an exemplary embodiment of the present invention.

These and other aspects of the present invention will now be described in greater detail. FIG. 1 is a diagram illustrating a system 100 for communicating information, in accordance with an exemplary embodiment of the present invention. The system 100 includes a filtering module 105 in communication with a ZIF communication circuit 110 or other suitable type of receiver, transmitter, transceiver or communication circuit or device. The filtering module 105 includes a first mixer circuit 115 in communication with an output (e.g., a transmission signal output or the like) of the ZIF communication circuit 110. The first mixer circuit 115 is configured to down-convert a transmission signal 112 at a first frequency $F_1$ from the ZIF communication circuit 110 to a second frequency $F_2$ to generate a down-converted transmission signal 117. The filtering module 105 includes a first filtering circuit 120 in communication with an output of the first mixer circuit 115. The first filtering circuit 120 is configured to filter the down-converted transmission signal 117 to generate a filtered down-converted transmission signal 122 at the second frequency $F_2$.

The first frequency $F_1$ can be any suitable frequency that can be used to transmit signals in, for example, a wireless network or the like (e.g., 2.4 GHz for I.E.E.E. 802.11 applications or the like). The second frequency $F_2$, which is lower than the first frequency $F_1$, can be any suitable intermediate frequency at which filtering according to exemplary embodiments can be performed. For example, according to an exemplary embodiment, if the first frequency $F_1$=2.4 GHz, then the second frequency $F_2$ can be $F_1$–810 MHz=1.59 GHz, although the second frequency $F_2$ can be any appropriate frequency that is suitably lower than the first frequency $F_1$.

The first filtering circuit 120 can comprise any suitable type of filter circuit or device that is capable of filtering noise, distortion and other spurious signals from the down-converted transmission signal 117 at the second frequency $F_2$ according to exemplary embodiments of the present invention. For purposes of illustration and not limitation, the first filtering circuit 120 can comprise, for example, a SAW filter or other suitable type of filter (e.g., Hamming filter, brick wall filter, suitable types of ceramic filters or other appropriate filter). The type of filter used for first filtering circuit 120 can also be chosen to reduce out-of-band noise to substantially mitigate or eliminate co-radio interference or other like interfering signals. Accordingly, the second frequency $F_2$ can be appropriately chosen to be a suitable intermediate frequency that is capable of being used by and operated upon by the filter circuit or device used for the first filtering circuit 120.

The filtering module 105 includes a second mixer circuit 125 in communication with an output of the first filtering circuit 120. The second mixer circuit 125 is configured to up-convert the filtered down-converted transmission signal 122 to a third frequency $F_3$ to generate a filtered transmission signal 127. According to exemplary embodiments, the filtered transmission signal 127 comprises the transmission signal 112 with the noise, distortion and other spurious signals removed or substantially reduced. The first and second mixer circuits 115 and 125 provide the "double-conversion" scheme of the present invention by translating the transmission signal 112 at the first frequency $F_1$ to a lower, second frequency $F_2$ for filtering, and then translating the resulting filtered signal at the second frequency $F_2$ to a higher, third frequency $F_3$ for transmission. According to an exemplary embodiment, the first frequency $F_1$ and the third frequency $F_3$ can be substantially identical, although the third frequency $F_3$ can be any suitable frequency that is higher than the second frequency $F_2$ and the same or different frequency than the first frequency $F_1$. The frequencies of the first and third frequencies $F_1$ and $F_3$ will depend on such factors as, for example, the nature and type of transmission scheme and protocol used, the transmission characteristics of the ZIF communication circuit 110 or other like transmitter, receiver, transceiver or communication circuit/device used, and other like factors.

The filtered transmission signal 127 can be transmitted using any suitable transmitter or communication circuit or device. For example, the output of the second mixer circuit 125 can be in communication with a transmitter circuit 130. The transmitter circuit 130 is configured to transmit the filtered transmission signal 127. For example, the transmitter circuit 130 can include a suitable bandpass filter 131 that receives and appropriately filters the filtered transmission signal 127. For example, for WiFi signals, the bandpass filter 131 can be used to filter or otherwise limit the (frequency) width of the filtered transmission signal 127 to the WiFi frequency band so as not to interfere with other signals. The resulting bandpass-filtered signal is appropriately amplified or otherwise raised in power level by a suitable power amplifier, such as, for example, power amplifier (PA) 133 in communication with the bandpass filter 131. According to exemplary embodiments, since the filtered transmission signal 127 is cleaner (i.e., having a clean spectrum with little or no noise or distortion) as a result of passing through the filtering module 105, the power level of the signal can be raised to greater levels to increase the transmission power without the concomitant increase in noise and other spurious signals.

The amplified signal from the PA 133 can be passed to a transmitter/receiver diversity switch 135 for transmission via antenna 140 using a suitable wireless transmission protocol, although the amplified signal can be alternatively transmitted via an appropriate wired connection using a suitable wired protocol or standard. The transmitter circuit 130 and accompanying transmission components can include additional and/or alternative elements necessary for wireless or wired signal transmission, depending on, for example, the type of signals being transmitted, the communication medium and protocol, and other like factors.

Either wireless or wired signals can also be received by the system 100 using any suitable receiver or communication circuit or device. For example, the system 100 can be configured to receive wireless signals via receiver antenna 145, which can be the same or different antenna than antenna 140. The signals received via antenna 145 are passed via the transmitter/receiver diversity switch 135 to a receiver circuit 150. The receiver circuit 150 is configured to receive signals for the system 100. For example, the receiver circuit 150 can include a suitable bandpass filter 151 that receives and appropriately filters the received signals. For example, for WiFi signals, the bandpass filter 151 can be used to filter or otherwise limit the (frequency) width of the received signals to the WiFi frequency band to remove out-of-band noise or other interfering signals. The resulting bandpass-filtered signal is appropriately amplified by a suitable low-noise amplifier 153 in communication with the bandpass filter 151. The receiver circuit 150 and accompanying receiver components can include additional and/or alternative elements necessary for wireless or wired signal reception, depending on, for example, the type of signals being received, the communication medium and protocol, and other like factors. The output of the receiver circuit 150 is a received signal 157 at a fourth frequency $F_4$.

The filtering module 105 includes a third mixer circuit 160. An input of the third mixer circuit 160 is in communication with an output of the receiver circuit 150. The third mixer circuit 160 is configured to receive the received signal 157 at the fourth frequency $F_4$. The third mixer circuit 160 is configured to down-convert the received signal 157 at the fourth frequency $F_4$ to a fifth frequency $F_5$ to generate a down-converted received signal 162. The filtering module 105 includes a second filtering circuit 165 in communication with an output of the third mixer circuit 160. The second filtering circuit 165 is configured to filter the down-converted received signal 162 to generate a filtered down-converted received signal 167 at the fifth frequency $F_5$.

The fourth frequency $F_4$ can be any suitable frequency that can be used to receive signals in an appropriate wireless or wired network, for example, a wireless network or the like (e.g., 2.4 GHz for I.E.E.E. 802.11 applications or the like). The fifth frequency $F_5$, which is lower than the fourth frequency $F_4$, can be any suitable intermediate frequency at which filtering according to exemplary embodiments can be performed. For example, according to an exemplary embodiment, if the fourth frequency $F_4$=2.4 GHz, then the fifth frequency $F_5$ can be $F_4$−810 MHz=1.59 GHz, although the fifth frequency $F_5$ can be any appropriate frequency that is suitably lower than the fourth frequency $F_4$. According to an exemplary embodiment, the fourth frequency $F_4$ can be substantially identical to the third frequency $F_3$, and the fifth frequency $F_5$ can be substantially identical to the second frequency $F_2$, although each frequency can be any suitable frequency.

The second filtering circuit 165 can comprise any suitable type of filter circuit or device that is capable of filtering noise, distortion and other spurious signals from the down-converted received signal 162 at the fifth frequency $F_5$ according to exemplary embodiments of the present invention. For purposes of illustration and not limitation, the second filtering circuit 165 can comprise, for example, a SAW filter or other suitable type of filter (e.g., Hamming filter, brick wall filter, suitable types of ceramic filters or other appropriate filter). The type of filter used for second filtering circuit 165 can also be chosen to reduce out-of-band noise to substantially mitigate or eliminate co-radio interference or other like interfering signals. Accordingly, the fifth frequency $F_5$ can be appropriately chosen to be a suitable intermediate frequency that is capable of being used by and operated upon by the filter circuit used for the second filtering circuit 165.

The filtering module 105 includes a fourth mixer circuit 125 in communication with an output of the second filtering circuit 165. The fourth mixer circuit 170 is configured to up-convert the filtered down-converted received signal 167 to a sixth frequency $F_6$ to generate a filtered received signal 172. The ZIF communication circuit 110 or other like transmitter, receiver, transceiver or communication circuit/device is in communication with an output of the fourth mixer circuit 170. According to exemplary embodiments, the filtered received signal 172 comprises the received signal 157 with the noise, distortion and other spurious signals removed or substantially reduced. The third and fourth mixer circuits 160 and 170 provide the "double-conversion" scheme of the present invention by translating the received signal 157 at the fourth frequency $F_4$ to a lower, fifth frequency $F_5$ for filtering, and then translating the resulting filtered signal at the fifth frequency $F_5$ to a higher, sixth frequency $F_6$ for reception by the ZIF communication circuit 110.

According to an exemplary embodiment, the fourth frequency $F_4$ and the sixth frequency $F_6$ can be substantially identical, although the sixth frequency $F_6$ can be any suitable frequency that is higher than the fifth frequency $F_5$ and the same or different frequency than the fourth frequency $F_4$. The frequencies of the fourth and sixth frequencies $F_4$ and $F_6$ will depend on such factors as, for example, the nature and type of reception scheme and protocol used, the receiver characteristics of the ZIF communication circuit 110 or other like transmitter, receiver, transceiver or communication circuit/device used, and other like factors. For example, according to one exemplary embodiment, the first, third, fourth and sixth frequencies $F_1$, $F_3$, $F_4$ and $F_6$ can be substantially identical to each other, and the second and fifth frequencies $F_2$ and $F_5$ can be substantially identical to each other, although each frequency can be any suitable frequency.

The filtering module 105 includes at least one oscillator circuit 175 in communication with the first, second, third and fourth mixer circuits 115, 125, 160 and 170. The at least one oscillator circuit 175 is configured to control the mixing frequencies of the first, second, third and fourth mixer circuits 115, 125, 160 and 170. According to an exemplary embodiment, the at least one oscillator circuit 175 can use the same crystal (e.g., frequency control signal or clock) as the ZIF communication circuit 110 to control the respective mixing frequencies. However, the at least one oscillator 175 can use any suitable frequency control signal or the like to control the mixing frequencies of each or any combination of the first, second, third and fourth mixing circuits 115, 125, 160 and 170. The at least one oscillator 175 can comprise any suitable type of RF oscillator or the like. For example, according to an exemplary embodiment, the at least one oscillator 175 can comprise a suitable Phase Locked Loop (PLL) oscillator circuit or the like.

Figure 2:
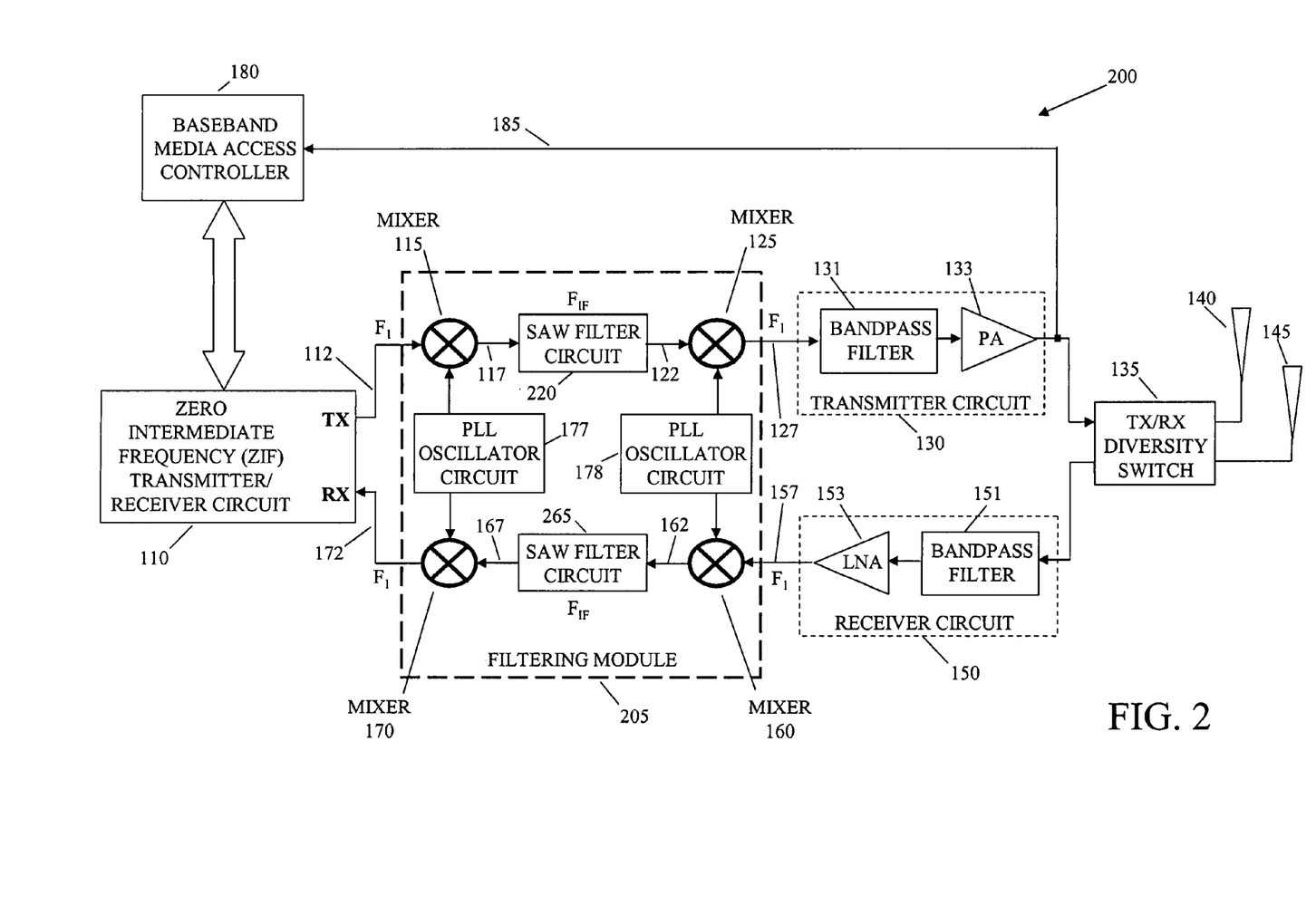
FIG. 2 is a diagram illustrating a system for communicating information, in accordance with an alternative exemplary embodiment of the present invention.

For purposes of illustration and not limitation, FIG. 2 is a diagram illustrating a system 200 for communicating information, in accordance with an alternative exemplary embodiment of the present invention. Many of the elements of the system 200 are similar or identical to those illustrated in FIG. 1 and as discussed above, and such features have been identified with like reference numerals. A discussion of those like elements will not be repeated. However, as indicated in FIG. 2, the first, third, fourth and sixth frequencies have been replaced with a single frequency (e.g., $F_1$) for transmission and reception, and the second and fifth frequencies have been replaced with a single intermediate frequency $F_{IF}$ at which filtering is performed by filtering module 205 using respective SAW filter circuits 220 and 265, as discussed previously according to one exemplary embodiment of the present invention.

According to the alternative exemplary embodiment illustrated in FIG. 2, the at least one oscillator circuit 175 of FIG. 1 can comprise a first oscillator circuit 177 and a second oscillator circuit 178. The first oscillator circuit 177 can be in communication with the first and fourth mixer circuits 115 and 170, while the second oscillator circuit 178 can be in communication with the second and third mixer circuits 125 and 160. As illustrated in FIG. 2, either or both of the first and second oscillator circuits 177 and 178 can comprise, for example, a PLL oscillator circuit or other suitable form of RF oscillator circuit. However, according to exemplary embodiments, any suitable number of oscillator circuits can be used to control the mixing frequencies of each of the mixer circuits. For example, each mixing circuit can be in communication with a separate oscillator circuit, or any combination of the first, second, third and fourth mixing circuits 115, 125, 160 and 170 can be in communication with respective oscillator circuits.

The filtering modules 105 and 205 can be configured to filter information communicated in any suitable type of network, either wireless or wired, such as, for example, a wireless mesh network or the like, using any suitable wireless or wired communication protocol or standard. For example, the systems 100 and 200 and, in particular, filtering modules 105 and 205 can be compatible with a standard including, but not limited to, I.E.E.E. 802.11, 802.11a, 802.11b, 802.11g, 802.11n, 802.11s, 802.16 and 802.20, or any other suitable wireless or wired standard. For example, exemplary embodiments can also be used in any suitable type of wired network that requires, for example, higher power and cleaner signals for transmission and reception.

The filtering modules 105 and 205 can be configured for either signal transmission, signal reception, or both signal transmission and reception. For example, the exemplary embodiments of filtering modules 105 and 205 illustrated in FIGS. 1 and 2, respectively, can be used for both signal transmission and reception. However, the filtering modules 105 and 205 can be configured for only signal transmission, for example, by including only first and second mixer circuits 115 and 125, the first filter circuit 120 (or first SAW filter circuit 220), and the oscillator circuit 175 (or either or both of the first and second oscillator circuits 177 and 178). Alternatively, the filtering modules 105 and 205 can be configured for only signal reception, for example, by including only third and fourth mixer circuits 160 and 170, the second filter circuit 165 (or second SAW filter circuit 265), and the oscillator circuit 175 (or either or both of the first and second oscillator circuits 177 and 178). In other words, the configuration of each of the filtering modules 105 and 205 will depend on, for example, the communication application in which they are being used.

It is noted that the various elements in FIGS. 1 and 2 that are in addition to and in communication with the filtering modules 105 and 205 are presented merely for purposes of illustration, and not limitation, to demonstrate exemplary configurations of communication systems in which the filtering modules 105 and 205 can be employed. Those of ordinary skilled will recognize that the filtering modules 105 and 205 can be used with any additional and/or alternative electrical or electronic components, devices or elements that can be used in or in conjunction with any suitable type of transmitter, receiver, transceiver, or communication circuit/device for communicating information signals, including additional and/or alternative mixers, local oscillators, demodulators, modulators, phase locked loops, additional and/or alternative power and low-noise amplifiers, power supplies, filters, analog-to-digital converters, digital-to-analog converters, or any other appropriate components, devices or elements in any suitable combination that can be used for communicating information signals, depending upon the nature and type of information signals to be communicated and the environment in which the filtering modules 105 and 205 are to be used. For example, the systems 100 and 200 can include a suitable baseband media access controller (MAC) 180 in communication with the ZIF communication circuit 110 for managing communications. The baseband MAC 180 can receive a suitable power detection signal 185 or the like (e.g., from a radio frequency detector diode or the like) from the power amplifier 133 for manipulating (e.g., attenuating) the envelope of the outgoing signal (e.g., transmission signal 112) to reduce the amplitude of such signal.

The filtering modules 105 and 205 can be connected to additional and/or alternative components, such as, for example, any suitable type of processor (e.g., any suitable type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like), and any suitable type of computer-readable memory or storage device (e.g., any suitable type of random access memory (RAM), read-only memory (ROM) or other suitable computer-readable medium). The processor (in conjunction with the memory) can be used, for example, to perform additional processing on either or both transmission signal 112 or received signal 157, for performing pre-processing on transmitted signals prior to being transmitted via antenna 140 or received signals after being received by antenna 145, or for controlling any part of the systems 100 and 200.

The first, second, third and fourth mixer circuits 115, 125, 160 and 170, the first and second filter circuits 120 and 165 (or first and second SAW filter circuits 220 and 265), oscillator circuit 175 (or first and second oscillator circuits 177 and 178), ZIF communication circuit 110, transmitter circuit 130 (and the components thereof), receiver circuit 150 (and the components thereof), transmitter/receiver diversity switch 135, and the baseband MAC 180 can each be implemented using any suitable type of discrete electrical or electronic device or circuit capable of performing the functions associated with the respective element. For example, the first, second, third and fourth mixer circuits 115, 125, 160 and 170 can each be implemented using any suitable type of passive or active mixer or frequency converter device, circuit or element. Accordingly, each component or device can be in communication with another component or device using any appropriate type of electrical connection that is capable of carrying electrical information.

Alternatively, at least the filtering module 105 or 205 can be formed on a monolithic substrate. In other words, any combination or all of the elements of the filtering module 105 or 205 can be constructed of common integrated circuit elements and can be implemented on a single chip or monolithic substrate. While the filtering module 105 or 205 can be implemented with integrated circuit technology, it will be evident to one having ordinary skill in the art that the invention can be suitably implemented in other semiconductor technologies, such as bipolar, bi-CMOS, and the like, as well as be portable to other forms of bidirectional communication devices. According to an alternative exemplary embodiment, each component or device of the filtering module 105 or 205 can be formed on, for example, a separate substrate and can be in communication with another component or device using any appropriate type of electrical connection that is capable of carrying electrical information. In other words, the circuitry according to exemplary embodiments of the present invention can be constructed from discrete components as opposed to a monolithic circuit.

Figure 3:
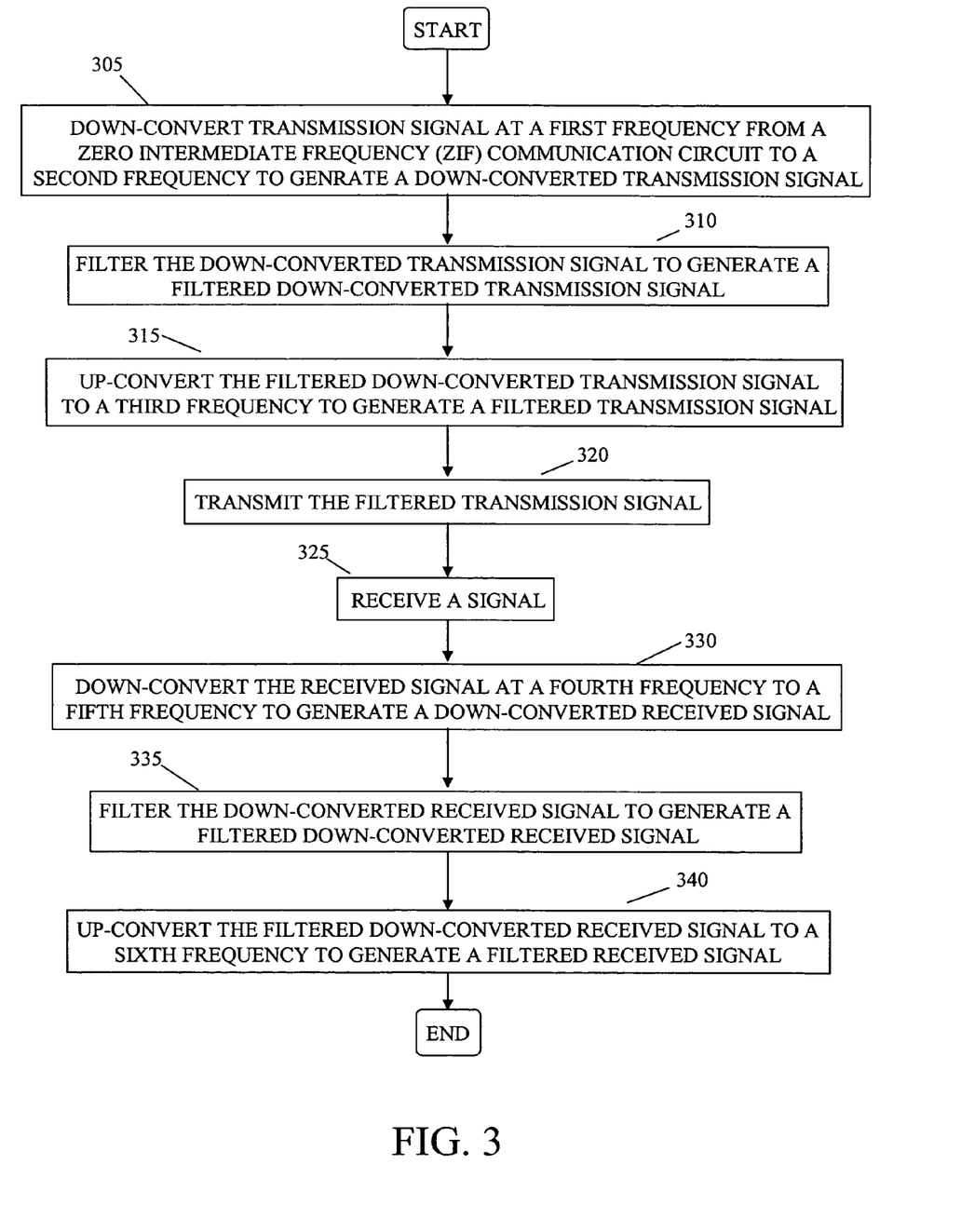
FIG. 3 is a flowchart illustrating steps for communicating information, in accordance with an exemplary embodiment of the present invention.

FIG. 3 is a flowchart illustrating steps for communicating information, in accordance with an exemplary embodiment of the present invention. In step 305, a transmission signal at a first frequency from a ZIF communication circuit (or other like transceiver or communication circuit or device) is down-converted to a second frequency to generate a down-converted transmission signal. In step 310, the down-converted transmission signal is filtered to generate a filtered down-converted transmission signal. For example, the down-converted transmission signal can be SAW filtered or the like. In step 315, the filtered down-converted transmission signal is up-converted to a third frequency to generate a filtered transmission signal. In step 320, the filtered transmission signal is transmitted.

In step 325, a signal is received. In step 330, the received signal at a fourth frequency is down-converted to a fifth frequency to generate a down-converted received signal. In step 335, the down-converted received signal is filtered to generate a filtered down-converted received signal. For example, the down-converted received signal can be SAW filtered or the like. In step 340, the filtered down-converted received signal is up-converted to a sixth frequency to generate a filtered received signal for processing by the ZIF communication circuit (or other like transceiver or communication circuit or device).

According to exemplary embodiments, the mixing frequencies of steps 305, 315, 330 and 335 can be controlled. For example, the mixing frequencies of steps 305 and 335 can be controlled separately from the mixing frequencies of steps 315 and 330, or any combination thereof. As discussed previously, the first, third, fourth, and sixth frequencies can be substantially identical, while the second and fifth frequencies can be substantially identical, although each frequency can be any suitable frequency. In addition, according to exemplary embodiments, the method can be compatible with a standard including at least one of I.E.E.E. 802.11, 802.11a, 802.11b, 802.11g, 802.11n, 802.11s, 802.16 and 802.20 or any other suitable wireless or wired standard.

Any combination or all of the steps of a computer program as illustrated in FIG. 3 for communicating information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used as at least part of an information communication system. For example, exemplary embodiments can be used in systems for communicating information over communication channels either wirelessly or by wired means. However, the circuits and systems according to exemplary embodiments can be used in any device or system that communicates information, including both wired and wireless communication systems, particularly where higher power and cleaner signals are required for transmission and reception.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. An apparatus for communicating information, comprising:
 a filtering module in communication with a zero intermediate frequency (ZIF) communication circuit,
  wherein the filtering module comprises:
   a first mixer circuit in communication with an output of the ZIF communication circuit,
    wherein the first mixer circuit is configured to down-convert a transmission signal at a first frequency from the ZIF communication circuit to a second frequency to generate a down-converted transmission signal;
   a first filtering circuit in communication with an output of the first mixer circuit,
    wherein the first filtering circuit is configured to filter the down-converted transmission signal to generate a filtered down-converted transmission signal;
   a second mixer circuit in communication with an output of the first filtering circuit,
    wherein the second mixer circuit is configured to up-convert the filtered down-converted transmission signal to a third frequency to generate a filtered transmission signal;
a third mixer circuit,
wherein the third mixer circuit is configured to receive a received signal at a fourth frequency, and
wherein the third mixer circuit is configured to down-convert the received signal to a fifth frequency to generate a down-converted received signal;
a second filtering circuit in communication with an output of the third mixer circuit,
wherein the second filtering circuit is configured to filter the down-converted received signal to generate a filtered down-converted received signal;
a fourth mixer circuit in communication with the second filtering circuit,
wherein the fourth mixer circuit is configured to up-convert the filtered down-converted received signal to a sixth frequency to generate a filtered received signal, and
wherein the ZIF communication circuit is in communication with an output of the fourth mixer circuit; and
at least one oscillator circuit in communication with the first, second, third and fourth mixer circuits,
wherein the at least one oscillator circuit is configured to control mixing frequencies of the first, second, third and fourth mixer circuits,
wherein the first, third, fourth, and sixth frequencies are substantially identical, wherein the second and fifth frequencies are substantially identical, and wherein the first filtering circuit is configured to substantially mitigate co-radio interference.

2. The apparatus of claim 1, wherein at least one of the first and second filtering circuits comprises a Surface Acoustic Wave (SAW) filter circuit.

3. The apparatus of claim 1, wherein the at least one oscillator circuit comprises a first oscillator circuit and a second oscillator circuit,
wherein the first oscillator circuit is in communication with the first and fourth mixer circuits, and
wherein the second oscillator circuit is in communication with the second and third mixer circuits.

4. The apparatus of claim 1, wherein the apparatus is configured to filter information communicated in a wireless mesh network.

5. The apparatus of claim 1, wherein the apparatus is formed on a monolithic substrate.

6. The apparatus of claim 1, wherein the apparatus is compatible with a standard including at least one of I.E.E.E. 802.11, 802.11a, 802.11b, 802.11g, 802.11n, 802.11s, 802.16 and 802.20.

7. A circuit for communicating information in a wireless network, comprising:
a filtering circuit in communication with a zero intermediate frequency communication circuit,
wherein the filtering circuit comprises:
a first frequency down-converter circuit in communication with an output of the zero intermediate frequency communication circuit;
a first filter circuit in communication with an output of the first frequency down-converter circuit;
a first frequency up-converter circuit in communication with an output of the first filter circuit;
a second frequency down-converter circuit;
a second filter circuit in communication with an output of the second frequency down-converter circuit;
a second frequency up-converter circuit in communication with an output of the second filter circuit and an input of the zero intermediate frequency communication circuit; and
a local oscillator circuit in communication with the first and second frequency down-converter circuits and the first and second frequency up-converter circuits
wherein the frequencies of (i) an input to the first frequency down-converter circuit, (ii) an output from the first frequency up-converter circuit, (iii) an input to the second frequency down-converter circuit, and (iv)) an output from the second frequency up-converter circuit, are substantially identical, wherein the frequencies of (i) an output of the first filter circuit and (ii) an output of the second filter circuit, are substantially identical, and wherein the first filter circuit is configured to substantially mitigate co-radio interference.

8. The circuit of claim 7, wherein at least one of the first and second filter circuits comprises a Surface Acoustic Wave (SAW) filter circuit.

9. The circuit of claim 7, wherein the local oscillator circuit comprises a Phase Locked Loop (PLL) oscillator circuit.

10. The circuit of claim 7, wherein the local oscillator circuit comprises a first local oscillator circuit and a second local oscillator circuit,
wherein the first local oscillator circuit is in communication with the first frequency down-converter circuit and the second frequency up-converter circuit, and
wherein the second local oscillator circuit is in communication with the first frequency up-converter circuit and the second frequency down-converter circuit.

11. The circuit of claim 10, wherein at least one of the first and second local oscillator circuits comprises a Phase Locked Loop (PLL) oscillator circuit.

12. The circuit of claim 7, wherein an output of the first frequency up-converter circuit is in communication with a transmitter circuit, and
wherein the transmitter circuit is configured to transmit a filtered transmission signal.

13. The circuit of claim 7, wherein an input of the second frequency down-converter circuit is in communication with a receiver circuit, and
wherein the receiver circuit is configured to receive the received signal.

14. The circuit of claim 7, wherein the circuit is configured to filter information communicated in a wireless mesh network.

15. The circuit of claim 7, wherein the circuit is formed on a monolithic substrate.

16. The circuit of claim 7, wherein the circuit is compatible with a standard including at least one of I.E.E.E. 802.11, 802.11a, 802.11b, 802.11g, 802.11n, 802.11s, 802.16 and 802.20.

17. A method of communicating information to/from a zero intermediate frequency (ZIF) communication circuit, comprising the steps of:
(a) down-converting a transmission signal at a first frequency from the ZIF communication circuit to a second frequency to generate a down-converted transmission signal;
(b) filtering the down-converted transmission signal to generate a filtered down-converted transmission signal;

(c) up-converting the filtered down-converted transmission signal to a third frequency to generate a filtered transmission signal;
(d) down-converting a received signal at a fourth frequency to a fifth frequency to generate a down-converted received signal;
(e) filtering the down-converted received signal to generate a filtered down-converted received signal; and
(f) up-converting the filtered down-converted received signal to a sixth frequency to generate a filtered received signal for the ZIF communication circuit
wherein the first, third, fourth, and sixth frequencies are substantially identical, wherein the second and fifth frequencies are substantially identical, and wherein the first filtering step substantially mitigates co-radio interference.

18. The method of claim 17, comprising the step of:
(g) controlling mixing frequencies of steps (a), (c), (d) and (f).

19. The method of claim 18, wherein step (g) comprises the steps of:
(g1) controlling the mixing frequencies of steps (a) and (f); and
(g2) separately controlling the mixing frequencies of steps (c) and (d).

20. The method of claim 17, wherein step (b) comprises the step of:
(b1) Surface Acoustic Wave (SAW) filtering the down-converted transmission signal.

21. The method of claim 17, wherein step (e) comprises the step of:
(e1) Surface Acoustic Wave (SAW) filtering the down-converted received signal.

22. The method of claim 17, comprising the step of:
(g) transmitting the filtered transmission signal.

23. The method of claim 17, comprising the step of:
(g) receiving the received signal.

24. The method of claim 17, wherein the transmission signal and the received signal are communicated in a wireless mesh network.

25. The method of claim 17, wherein the method is compatible with a standard including at least one of I.E.E.E. 802.11, 802.11a, 802.11b, 802.11g, 802.11n, 802.11s, 802.16 and 802.20.

26. A circuit for communicating information in a wireless network, comprising:
a first filtering module in communication with a zero intermediate frequency communication circuit,
wherein the filtering module comprises:
a first frequency down-converter circuit in communication with an output of the zero intermediate frequency communication circuit;
a first filter circuit in communication with an output of the first frequency down-converter circuit;
a first frequency up-converter circuit in communication with (i) an output of the first filter circuit and (ii) a transmitter circuit;
a second filtering module in communication with a receiver circuit,
wherein the second filtering module comprises:
a second frequency down-converter circuit in communication with an output of the receiver circuit;
a second filter circuit in communication with an output of the second frequency down-converter circuit;
a second frequency up-converter circuit in communication with (i) an output of the second filter circuit and (ii) an input of the zero intermediate frequency communication circuit; and
a local oscillator circuit in communication with the frequency down-converter circuits and the frequency up-converter circuits
wherein the frequencies of (i) an input to the first frequency down-converter circuit, (ii) an output from the first frequency up-converter circuit, (iii) an input to the second frequency down-converter circuit, and (iv)) an output from the second frequency up-converter circuit, are substantially identical, wherein the frequencies of (i) the output of the first filter circuit and (ii) the output of the second filter circuit, are substantially identical, and wherein the first filter circuit is configured to substantially mitigate co-radio interference.

27. A circuit for communicating information in a wireless network, comprising:
a first filtering module in communication with a zero intermediate frequency communication circuit,
wherein the first filtering module comprises:
a first frequency down-converter circuit inputting a first frequency and outputting a second frequency;
a first filter circuit in communication with an output of the first frequency down-converter circuit;
a first frequency up-converter circuit in communication with an output of the first filter circuit and outputting a third frequency to an input of a transmitter circuit; and
a second filtering module in communication with a receiver circuit,
wherein the second filtering module comprises:
a second frequency down-converter circuit inputting a fourth frequency and outputting a fifth frequency;
a second filter circuit in communication with an output of the second frequency down-converter circuit;
a second frequency up-converter circuit in communication with an output of the second filter circuit and outputting a sixth frequency to an input of the zero intermediate frequency communication circuit; and
a local oscillator circuit in communication with the frequency down-converter circuits and the frequency up-converter circuits
wherein the first, third, fourth, and sixth frequencies are substantially identical, wherein the second and fifth frequencies are substantially identical, and wherein the first filter circuit is configured to substantially mitigate co-radio interference.

* * * * *